United States Patent [19]

Lynch et al.

[11] 4,091,300
[45] May 23, 1978

[54] PERMANENT MAGNET ELECTRICAL MACHINES

[75] Inventors: Ronald Lynch, Hemel Hempstead; John Harold Purcell, Dunstable, both of England

[73] Assignee: Lucas Industries Limited, Great Britain

[21] Appl. No.: 717,146

[22] Filed: Aug. 24, 1976

[30] Foreign Application Priority Data

Aug. 30, 1975  United Kingdom ............... 35847/75
Oct. 8, 1975   United Kingdom ............... 41387/75

[51] Int. Cl.$^2$ .......................................... H02K 21/28
[52] U.S. Cl. .................................................. 310/154
[58] Field of Search ................................ 310/152–159, 310/254

[56] References Cited

U.S. PATENT DOCUMENTS 3,249,780  5/1966  Ibrahim et al. ..................... 310/154
3,521,096  7/1970  Merriam ............................. 310/154

Primary Examiner—Donovan F. Duggan
Attorney, Agent, or Firm—Kane, Dalsimer, Kane, Sullivan and Kurucz

[57] ABSTRACT

A permanent magnet electrical machine includes a plurality of groups of permanent magnets which are magnetically coupled by a surrounding generally cylindrical housing of magnetic material. The magnets have flat, parallel, spaced pole faces and are arranged side by side with pole faces of the same polarity from the axis of the housing. An armature is rotatably mounted in the housing within the magnets.

4 Claims, 5 Drawing Figures

PERMANENT MAGNET ELECTRICAL MACHINES

This invention relates to permanent magnet electrical machines, particularly (but not exclusively) permanent magnet motors.

A conventional permanent magnet motor is known which is provided with a permanent magnet field assembly including two permanent magnets magnetically coupled by a housing of electromagnetic material. Each magnet is in the form of a part-cylindrical shell magnetised radially so that one magnet has an inner pole face of one polarity and the other has an inner pole face of opposite polarity.

Motors of this type present a number of difficulties in manufacture. Firstly to minimise "cogging" it has been proposed to relieve the edges of the pole faces and this involves difficulty both in making the magnets and in magnetising them. Secondly, in order to ensure accurate location of the magnet in the housing it has been proposed to make the external radius of each magnet larger than the radius of the locating face in the housing so that the magnet rests on its two edges in the housing. This involves providing the inner and outer faces of the magnet with radii struck from different axes, which creates difficulty in manufacture. Finally radial magnetisation, which is ideal, is difficult to obtain with modern magnetic materials and diametral magnetisation (where the flux in the magnet is parallel to a single radius rather than radial at all points) reduces the efficiency of the motor.

It is an object of the invention to provide a permanent magnet electrical machine which has a permanent magnet arrangement such that these manufacturing difficulties are avoided.

A permanent magnet electrical machine in accordance with the invention includes a housing of magnetic material, a plurality of groups of magnets in the housing and magnetically coupled thereby, each magnet of each group having flat spaced parallel pole faces, the magnets of each group being arranged side by side with pole faces of the same polarity innermost, and an armature rotatably supported in the housing and incorporating a rotor having teeth and windings on said rotor. Preferably the magnets of each group are spaced around the armature axis at an angle different from the angular pitch of the teeth of the rotor.

An example of the invention is shown in the accompanying drawings, in which

The motor shown includes a housing 10 of electromagnetic material in which there are mounted two groups of three magnets 11, 12. Each magnet is in the form of a length of rectangular section strip magnetised in a direction perpendicular to its larger faces. These faces therefore form pole faces of opposite polarity. The three magnets of each group are arranged side by side with their lengths parallel to, and their inner pole faces substantially equidistant from, the axis of the housing. To this end three shallow rectangular locating grooves are formed in the housing for each group of magnets, for example by broaching.

Figure 1:
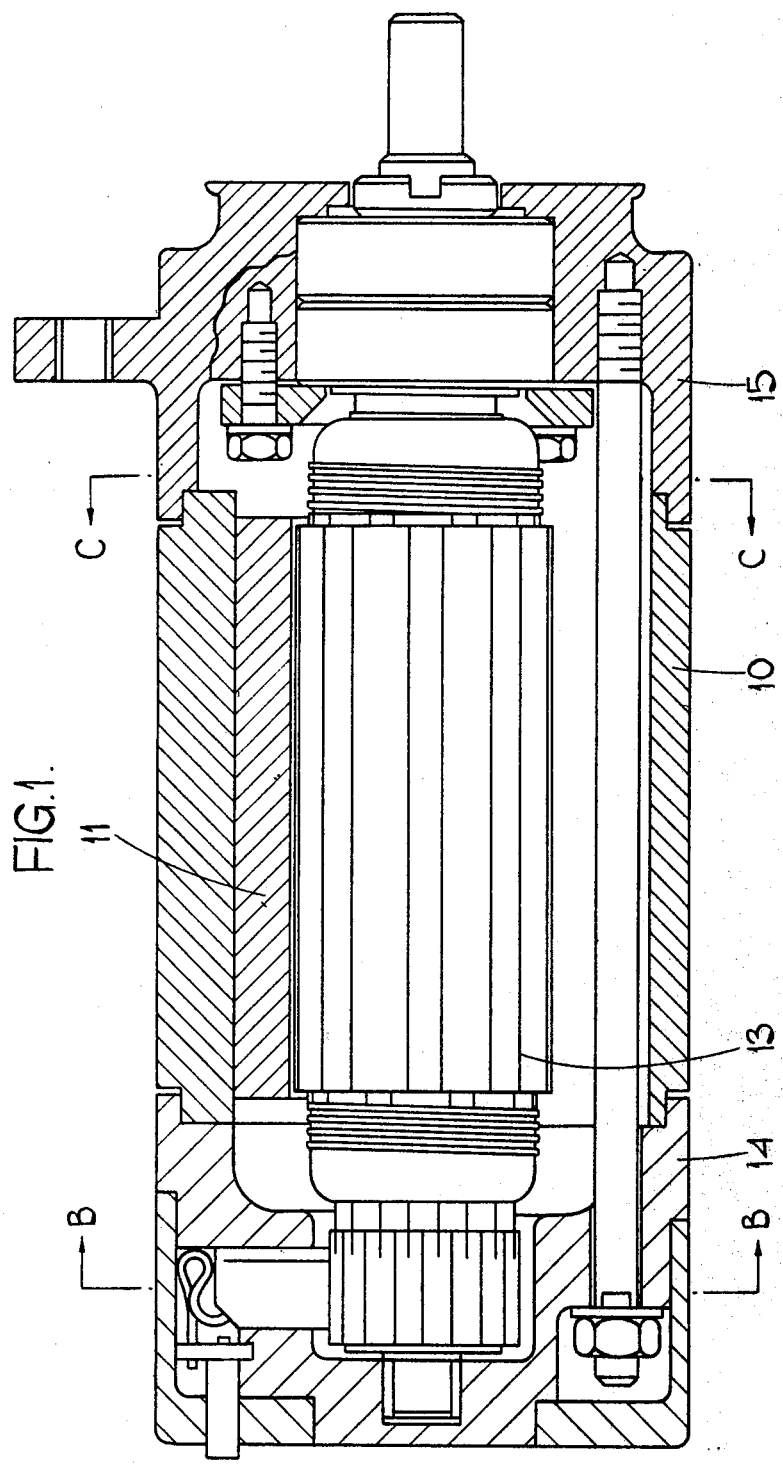
FIGS. 1 and 2 are sections through a motor on lines B—B in FIG. 2 and A—A in FIG. 1 respectively.
Figure 2:
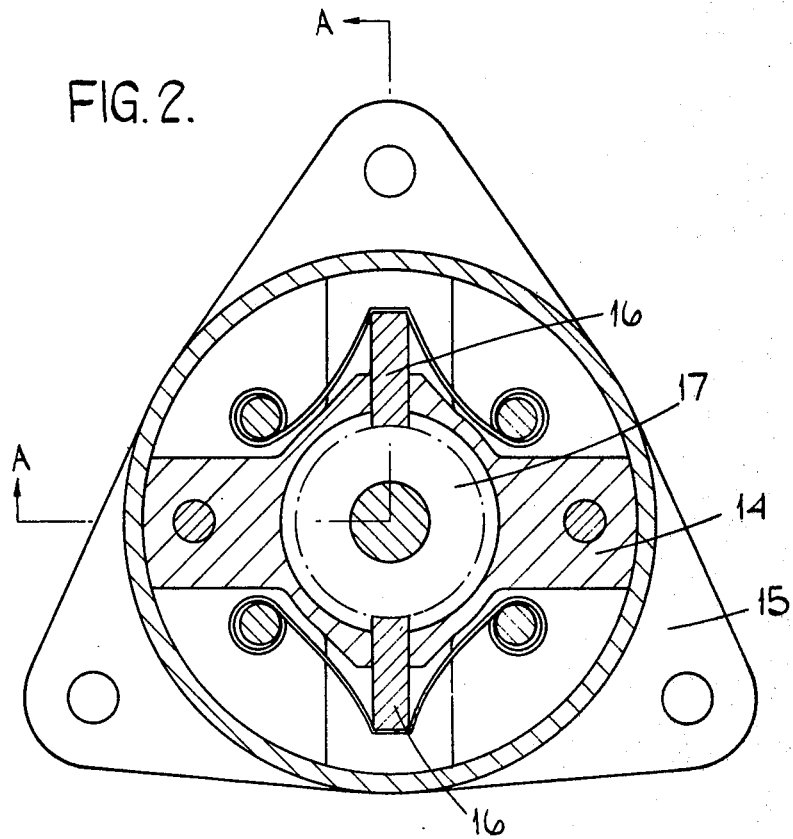
Figure 3:
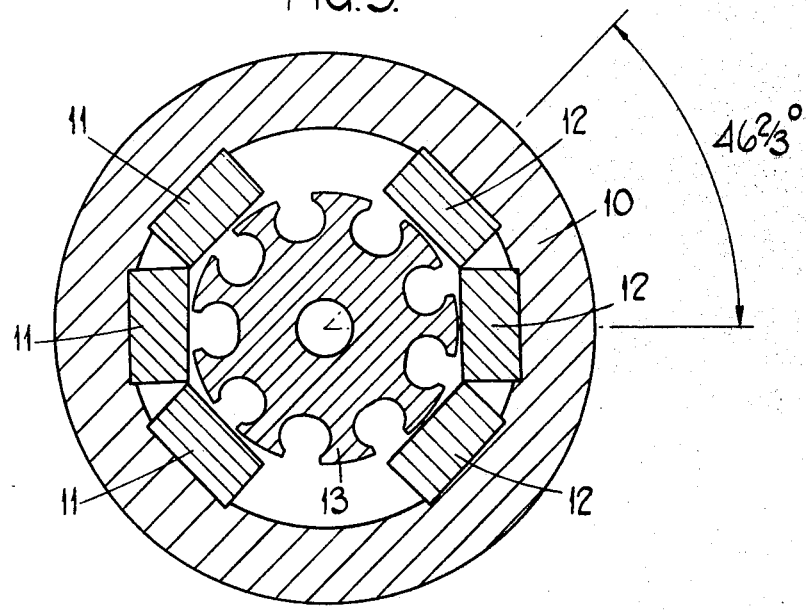
FIG. 3 is a section on line C—C in FIG. 1 with some detail omitted for clarity.

It will be noted from FIG. 3 that the arrangement described automatically provides the type of relief required at the edges of each group of magnets to overcome "cogging" problems and it will be appreciated that this is a direct result of utilising a group of flat faced magnets for each pole. In addition since there are three magnets in each group, the group approximates to a truly radially magnetised magnet.

The motor also includes an armature 13 which is rotatably supported by bearings on end caps 14, 15 at opposite ends of the housing 10. The end cap 15 is of electrically insulating material slidably supporting brushes 16 coacting with a commutator 17 on the armature.

The motor has a nine-pole armature 13 so that its teeth occur at an angular pitch of 40°. The magnets of each group are arranged at an angular pitch of $46\frac{2}{3}°$.

It will be appreciated that cogging occurs in an electric motor of this general type because there are sharply defined positions of minimum potential energy. With the arrangement described, however, with the angular pitch of the magnets different from the angular pitch of the armature teeth, these minima are less sharply defined. Thus, taking, for example, the armature pole at the right of the drawing this is at its closest approach to the centre magnet 12 whereas the tooth above is still $6\frac{2}{3}°$ short of its closest approach and the tooth below has passed its closes approach by $6\frac{2}{3}°$ (assuming the direction of rotation to be anti-clockwise). The torque required to move the armature out of one of its stable 'cog' positions is reduced, since the six magnets making up the stator poles act sequentially on the armature instead of acting simultaneously as in the case where a single arcuate magnet is used for each pole.

Generally speaking for an n-pole rotor, the spacing of the magnets which are arranged in two groups of M each will be $(360/n)(1+\frac{1}{2}M)$.

In the example shown in FIG. 3 the innermost pole face of each magnet is tangential at its centre line to an imaginary circle struck from the axis of the housing. Thus each pole face is equidistant from the axis.

Figure 4:
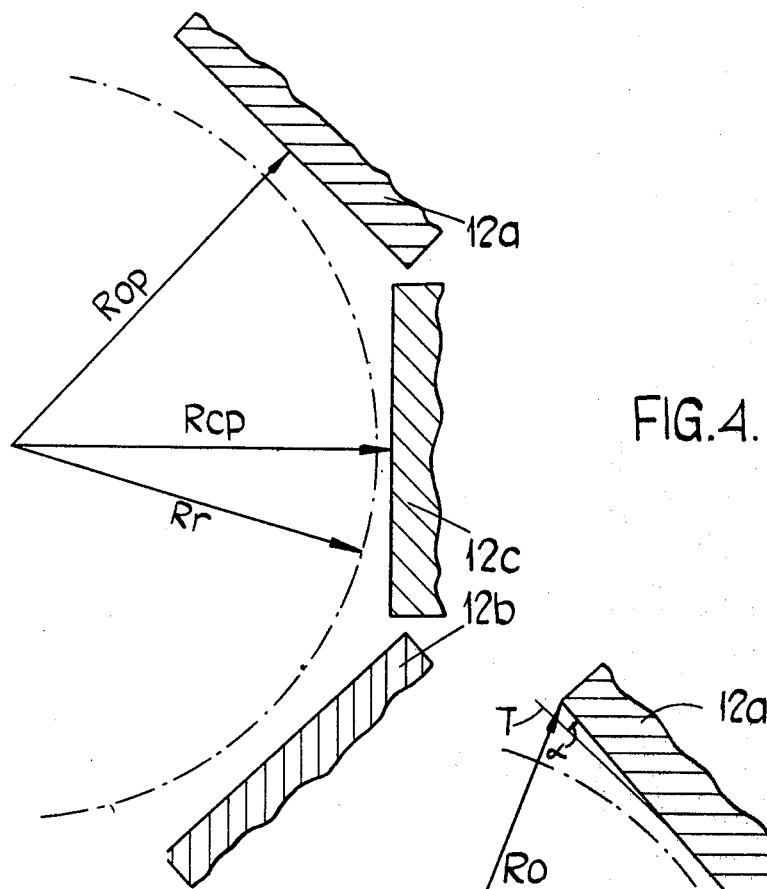
FIGS. 4 and 5 are enlarged portions like part of FIG. 3, but showing two possible modifications.

In the modification shown in FIG. 4 the pole faces are still tangential at their centre lines to circles struck from the axis but in this case the outer pole faces of each group are tangential to a slightly larger circle than that to which the middle pole faces are tangential. As shown the pole faces of the outer magnets 12a, 12b are tangential to a circle of radius $R_{op}$ whereas the pole face of the remaining magnet 12c is tangential to a circle of radius $R_{cp}$ where $R_{op}$ is larger than $R_{cp}$. FIG. 4 also shows a circle $R_r$ which represents the maximum radius of the rotor. The minimum thickness of the air gap between the outer pole faces and the rotor (i.e. the difference between $R_{op}$ and $R_r$) is no more than four times the minimum gap between the centre pole piece and the rotor (i.e. the difference between $R_{cp}$ and $R_r$).

Figure 5:
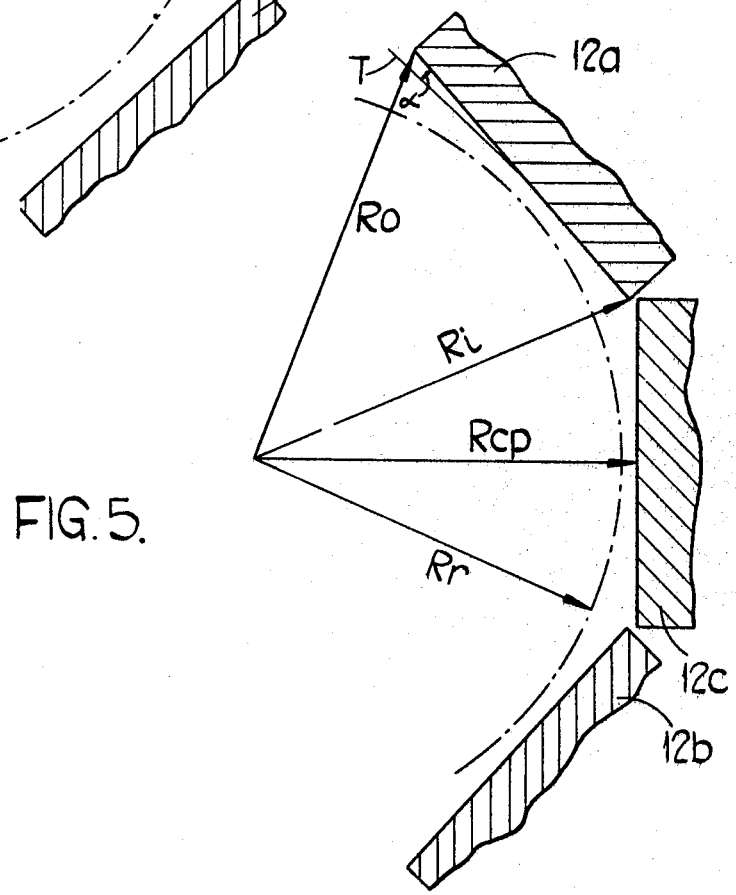

Turning now to FIG. 5, magnets 12a, 12b and 12c all have their inner pole faces tangential to the same circle, but in the case of the two outer magnets 12a and 12b the tangent is not at the centre line of pole face, but closer to the centre magnet 12c. Thus, at the centre line of each outer magnet 12a, 12b, the pole face is not tangential to the circle of radius struck from the axis and intersecting the centre line but inclined to such a tangent (T) at an angle $\alpha$. Thus the inner edges of the pole faces of the magnets 12a and 12b are closer to the axis than the outer edges (i.e. $R_i < R_o$) but each is of course further from the axis than the centre line of the pole face of the centre magnet 12c.

The outer magnets 12a and 12c may, of course, be both inclined as shown in FIG. 5 and further from the axis than the centre magnet as shown in FIG. 4.

The modification shown in FIGS. 4 and 5 both assist in preventing cogging.

I claim:

1. A permanent magnet electrical machine comprising:
   a. a housing of magnetic material;
   b. an armature rotatably supported in the housing and incorporating a rotor having teeth and windings on said rotor; and
   c. two groups of magnets in the housing and magnetically coupled thereby, each magnet of each group having flat spaced parallel pole faces, the magnets of each group being arranged side by side with pole faces of the same polarity innermost and spaced around the armature axis at an angle different from the angular pitch of the teeth of the rotor, said angle defined by the expression $(360/n)(1 + \frac{1}{2}M)$, where $n$ is the number of teeth on the rotor and $M$ is the number of magnets in each group.

2. A machine as claimed in claim 1, in which the centre lines of the innermost pole faces of the magnets are equidistant from the axis of the housing.

3. A permanent magnet eletrical machine comprising:
   a. a housing of magnetic material;
   b. an armature rotatably supported in the housing and incorporating a rotor having teeth and windings on said rotor; and
   c. a plurality of groups of at least three magnets per group in the housing and magnetically coupled thereby, each magnet of each group having flat spaced parallel pole faces, the magnets of each group being arranged side by side with pole faces of the same polarity innermost, each group having the center lines of the innermost pole faces spaced from the axis of the housing by a distance greater than the spacing of the axis of the housing from the center line of each other magnet in the group by no more than four times the difference between the maximum radius of the rotor and the spacing of the axis of the housing from the center line of each other magnet in the group.

4. A permanent magnet electrical machine comprising:
   a. a housing of magnetic material;
   b. a plurality of groups of at least three magnets per group in the housing and magnetically coupled thereby, each magnet of each group having flat spaced parallel pole faces, the magnets of each group being arranged side by side with pole faces of the same polarity innermost, the outermost magnets of each group having its innermost pole face inclined to a tangent to an imaginery circle struck from the axis of the housing and passing through the center line of the innermost pole face at said innermost pole face so that the outer edge of said innermost pole face is further from the axis of the housing than the inner edge thereof; and
   c. an armature rotatably supported in the housing and incorporating a rotor having teeth and windings on said rotor.

* * * * *

UNITED STATES PATENT OFFICE
CERTIFICATE OF CORRECTION

PATENT NO. : 4,091,300
DATED : May 23, 1978
INVENTOR(S) : Ronald Lynch and John Harold Purcell It is certified that error appears in the above-identified patent and that said Letters Patent are hereby corrected as shown below:

Column 1, line 52, "B-B" and "A-A" are reversed.

Column 2, line 38, " $\frac{1}{2}$ M " should be -- $\frac{1}{2M}$ --.

Column 3, line 24, " $\frac{1}{2}$ M " should be -- $\frac{1}{2M}$ --.

Signed and Sealed this

Twenty-sixth Day of February 1980

[SEAL]

Attest:

SIDNEY A. DIAMOND

Attesting Officer   Commissioner of Patents and Trademarks